US012781693B2

(12) United States Patent
Kim

(10) Patent No.: US 12,781,693 B2
(45) Date of Patent: Nov. 3, 2026

(54) TRAP ADAPTER FOR EXHAUST GAS RECIRCULATION VALVE AND EXHAUST GAS RECIRCULATION VALVE INCLUDING THE SAME

(71) Applicant: Korens Global Co., Ltd., Yangsan-si (KR)

(72) Inventor: Young Kwon Kim, Busan (KR)

(73) Assignee: Korens Global Co., Ltd., Yangsan-si (KR)

( * ) Notice: Subject to any disclaimer, the term of this patent is extended or adjusted under 35 U.S.C. 154(b) by 0 days.

(21) Appl. No.: 19/337,753

(22) Filed: Sep. 23, 2025

(65) Prior Publication Data

US 2026/0085648 A1 Mar. 26, 2026

(30) Foreign Application Priority Data

Sep. 25, 2024 (KR) ........................ 10-2024-0129888

(51) Int. Cl.
*F02M 26/51* (2016.01)
*F02M 26/16* (2016.01)
*F02M 26/72* (2016.01)

(52) U.S. Cl.
CPC ............ *F02M 26/51* (2016.02); *F02M 26/16* (2016.02); *F02M 26/72* (2016.02)

(58) Field of Classification Search
CPC ........ F02M 26/51; F02M 26/16; F02M 26/72; F02M 26/35; F02M 26/70; F02M 26/67
See application file for complete search history.

(56) References Cited

U.S. PATENT DOCUMENTS 10,519,901 B2 * 12/2019 Kuske .................... F02M 26/17

* cited by examiner

*Primary Examiner* — Xiao En Mo
(74) *Attorney, Agent, or Firm* — Dinsmore & Shohl LLP; Yongsok Choi, Esq.

(57) ABSTRACT

A trap adapter for an exhaust gas recirculation (EGR) valve and an EGR valve including the same are provided, the EGR valve including: a valve housing including a flow passage through which exhaust gas of an engine passes; a valve flap disposed inside the flow passage and configured to open and close the flow passage; an exhaust duct disposed on one side of the valve housing and including an exhaust passage communicating with the flow passage; and a trap adapter disposed at an outlet of the flow passage and configured to capture condensate generated in the exhaust passage and discharge the condensate to the flow passage.

10 Claims, 8 Drawing Sheets

AS

TRAP ADAPTER FOR EXHAUST GAS RECIRCULATION VALVE AND EXHAUST GAS RECIRCULATION VALVE INCLUDING THE SAME

CROSS-REFERENCE TO RELATED APPLICATION

This application is based on and claims priority under 35 U.S. C. § 119 to Korean Patent Application No. 10-2024-0129888, filed on Sep. 25, 2024, in the Korean Intellectual Property Office, the disclosure of which is incorporated by reference herein in its entirety.

BACKGROUND

1. Field

One or more embodiments relate to a trap adapter for an exhaust gas recirculation (EGR) valve and an EGR valve including the trap adapter.

2. Description of the Related Art

As interest in the atmospheric environment grows, regulations on exhaust gases emitted from automobiles, boilers, power generation facilities, etc. are being implemented. For example, in automobiles, incomplete combustion occurs in the engine, and the exhaust gas generated by this contains pollutants such as nitrogen oxides ($NO_x$), carbon monoxide (CO), and sulfur dioxide, and regulations to reduce these are being implemented worldwide.

Therefore, various devices are provided to recirculate exhaust gases emitted from automobile engines back into the engine to achieve complete combustion and reduce pollutants contained in the exhaust gases. For example, devices for reducing pollutants contained in exhaust gas include Selective Catalyst Reduction (SCR), Diesel Particle Filter (DPF), and Exhaust Gas Recirculation (EGR: hereinafter referred to as EGR).

Among these devices, EGR is a device that may reduce the formation of nitrogen oxides and other substances by recirculating exhaust gases combusted in automobile engines. For example, since nitrogen oxides have a problem in that the amount thereof formed rapidly increases at high temperatures of 2,000° C. or higher, EGR is a device that cools a portion of the exhaust gas and recirculates the cooled exhaust gas into the engine's combustion chamber to lower the temperature of the combustion chamber.

That is, the temperature of the exhaust gas discharged from the engine is about 600° C. to 700° C., but the temperature drops to about 100° C. to 350° C. after passing through a cooler of the EGR, and the exhaust gas cooled in this way flows into an EGR valve, and by opening a valve flap, the exhaust gas is then recirculated to the combustion chamber of the engine through an exhaust duct connected to a valve housing through the inside of the valve housing.

When exhaust gas flows into the exhaust duct through the inside of the valve housing, condensate is generated as the exhaust gas comes into contact with the inner surface of the exhaust duct due to the temperature difference between the inside and outside of the exhaust duct.

The condensate generated in this way usually flows into the valve housing of the EGR valve along the inner side of the exhaust duct, oxidizing or corroding the inner surface of the flow passage of the valve housing.

In particular, there was a problem in that the condensate flowed into the valve flap that opens or closes the exhaust gas passage of the valve housing and into a flap drive portion, freezing in low-temperature environments, and thereby degrading the performance or durability of the EGR valve.

SUMMARY

One or more embodiments include a trap adapter for an exhaust gas recirculation (EGR) valve and an EGR valve including the trap adapter, which may prevent condensate generated on the inner surface of an exhaust duct due to a temperature difference between the inside and outside of the exhaust duct, from flowing into a valve housing.

The objectives to be achieved by the present disclosure are not limited to the objectives mentioned above, and other objectives and advantages of the present disclosure that are not mentioned herein may be understood by the following description and will be more clearly understood by the embodiments of the present disclosure. In addition, it will be appreciated that the objectives and advantages to be achieved by the present disclosure may be realized by the means and combinations thereof indicated in the patent claims.

According to one or more embodiments, an EGR valve includes: a valve housing including a flow passage through which exhaust gas of an engine passes; a valve flap disposed inside the flow passage and configured to open and close the flow passage; an exhaust duct disposed on one side of the valve housing and including an exhaust passage communicating with the flow passage; and a trap adapter disposed at an outlet of the flow passage and configured to capture condensate generated in the exhaust passage and discharge the condensate to the flow passage.

In the present embodiment, the trap adapter may include: a body portion having a pipe shape that is opened on opposite sides in an axial direction, and having an outer surface spaced apart from an inner surface of the exhaust duct; and a discharge hole portion which is formed at one end of the body portion adjacent to the flow passage and guides, to the flow passage, condensate collected in a space between the inner surface of the exhaust duct and the outer surface of the body portion.

In the present embodiment, the valve housing may include a stepped groove portion formed on an inner surface of an outlet through which the exhaust gas is discharged, and the trap adapter may include a stepped portion formed on an outer surface of one end of the body portion and coupled to the stepped groove portion.

In the present embodiment, when the stepped portion may be coupled to the stepped groove portion, an inner surface of the body portion is connected to an inner surface of the flow passage.

In the present embodiment, the discharge hole portion may be formed at a position corresponding to one side of the valve flap rotating toward the exhaust passage when the flow passage is opened by rotation of the valve flap.

In the present embodiment, the exhaust duct may be formed such that a cross-sectional area of the exhaust passage is gradually reduced in a direction in which the exhaust gas is discharged.

In the present embodiment, the EGR valve may further include a sealing member provided between the valve housing and the exhaust duct to maintain airtightness.

According to one or more embodiments, a trap adapter for an EGR valve, includes: a body portion provided between a flow passage of a valve housing and an exhaust passage of an exhaust duct coupled to the valve housing, wherein the body portion has an outer surface spaced apart from an inner surface of the exhaust duct; and a discharge hole portion formed at one end of the body portion adjacent to the flow passage and configured to guide, to the flow passage, condensate collected in a space between the inner surface of the exhaust duct and the outer surface of the body portion, wherein the valve housing includes a stepped groove portion formed on an inner surface of an outlet through which the exhaust gas is discharged, and the body portion includes a stepped portion formed on an outer surface of one end of the body portion and coupled to the stepped groove portion.

In the present embodiment, the discharge hole portion may be formed at a position corresponding to one side of a valve flap rotating toward the exhaust passage when the flow passage is opened.

In the present embodiment, when the stepped portion may be coupled to the stepped groove portion, an inner surface of the body portion may be connected to an inner surface of the flow passage.

BRIEF DESCRIPTION OF THE DRAWINGS

The following drawings attached to the present specification illustrate embodiments of the present disclosure and, in conjunction with the detailed description of the present disclosure described below, facilitate understanding of the technical idea of the present disclosure; therefore, the present disclosure should not be interpreted as being limited to matters described in such drawings.

DETAILED DESCRIPTION

Figure 1:
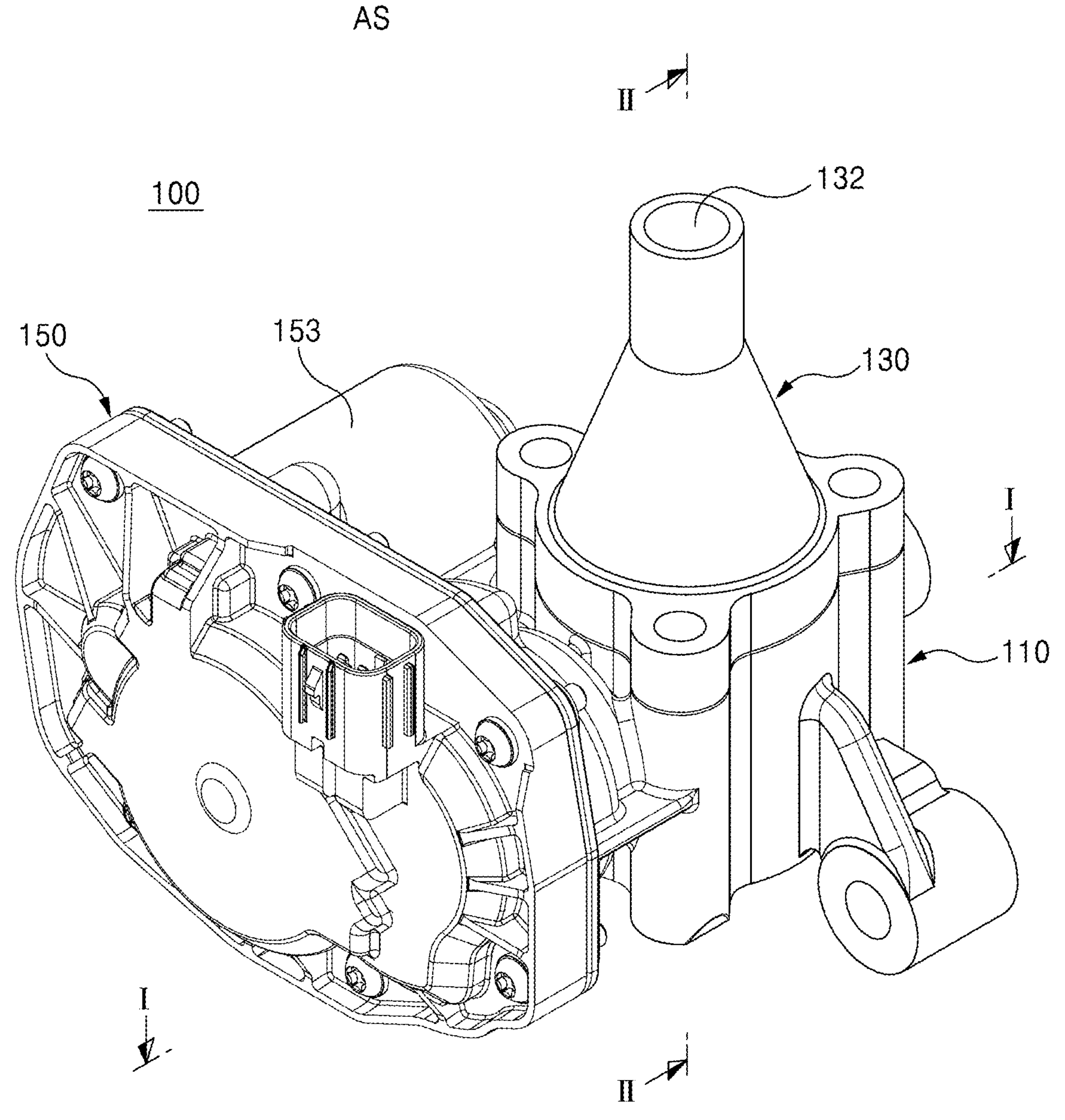
FIG. 1 is a perspective view illustrating an exhaust gas recirculation (EGR) valve according to an embodiment of the present disclosure.

Hereinafter, embodiments of the present disclosure will be described in detail with reference to the attached drawings. Prior to this, the meaning of the terms used in the present specification and claims of the present disclosure should not be limited to be of ordinary or literary meaning but construed as meanings and concepts not departing from the spirit and scope of the present disclosure based on the principle that the inventor is capable of defining concepts of terms in order to describe his or her disclosure in the most appropriate way. Accordingly, the features disclosed in the preferred embodiments and drawings of the present specification are examples of embodiments of the present disclosure, and thus it should be understood that there are alternative equivalents or variation examples that can replace the embodiments at the point of the filing of the present application.

It will be further understood that the terms "comprise," "include" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Additionally, to aid understanding of the present disclosure, the attached drawings are not drawn to scale and the dimensions of some components may be exaggerated. Additionally, like reference numerals are used for like elements in different embodiments.

As used herein, when two elements are described as being 'the same,' it is to be understood that the elements are 'substantially the same.' Therefore, substantial equivalence may include deviations that are considered low in the art, for example, deviations of 5% or less. Additionally, uniformity of a parameter over a given range may indicate uniformity from an average perspective.

Although the terms "first, second," etc. are used to describe various components, these components are not limited by these terms. These terms are only used to distinguish one component from another, and unless there is a particular description contrary thereto, a first component may also be a second component.

Throughout the specification, unless otherwise specifically stated, each element may be singular or plural.

Any component being arranged "on (or below)" a component or "on (or below)" a component may indicate not only that any component is arranged in contact with the upper surface (or lower surface) of said component, but also that other components may be between said component and any component arranged on (or below) said component.

Additionally, when a component is describe as being "connected," "coupled," or "linked" to another component, it should be understood that the components may be directly connected or linked to one another, but that other components may also be "interposed" between the components, or that each component may be "connected," "coupled," or "linked" through other components. Also, when a part is described as being electrically coupled to another part, this includes not only cases where the parts are directly connected, but also cases where the parts are connected with another element in between.

Whenever reference is made throughout the specification to "A and/or B," this indicates A, B or A and B, unless otherwise specified. That is, "and/or" includes all or any combination of the listed items. When "C to D" is described, this indicates C or higher and D or lower, unless otherwise stated.

The terminology used herein is for the purpose of describing embodiments of the present disclosure and is not intended to be limiting of the present disclosure.

Figure 2:
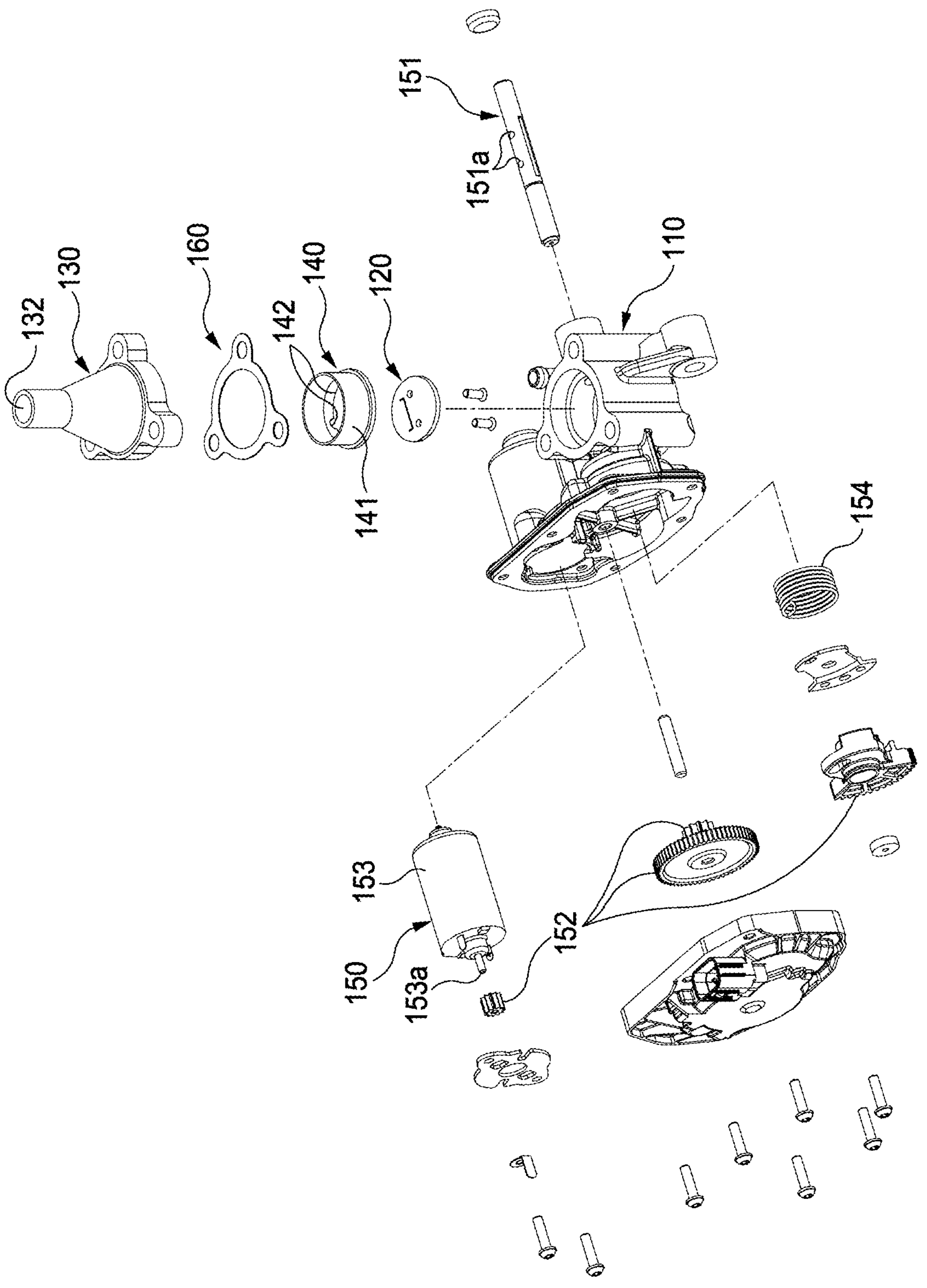
FIG. 2 is an exploded perspective view of the EGR valve of FIG. 1.
Figure 3:
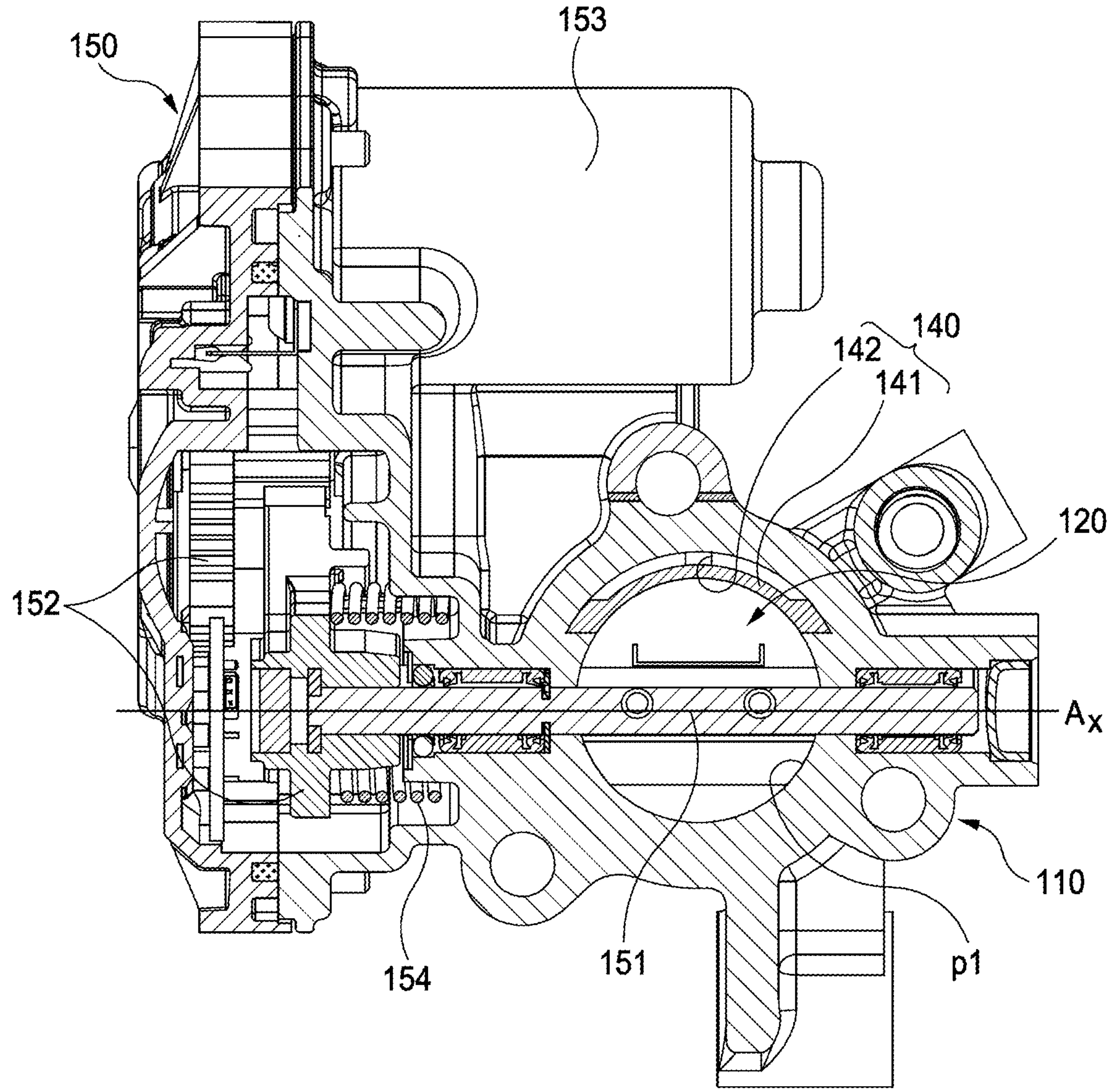
FIG. 3 is a cross-sectional view taken along line I-I of FIG. 1.
Figure 4:
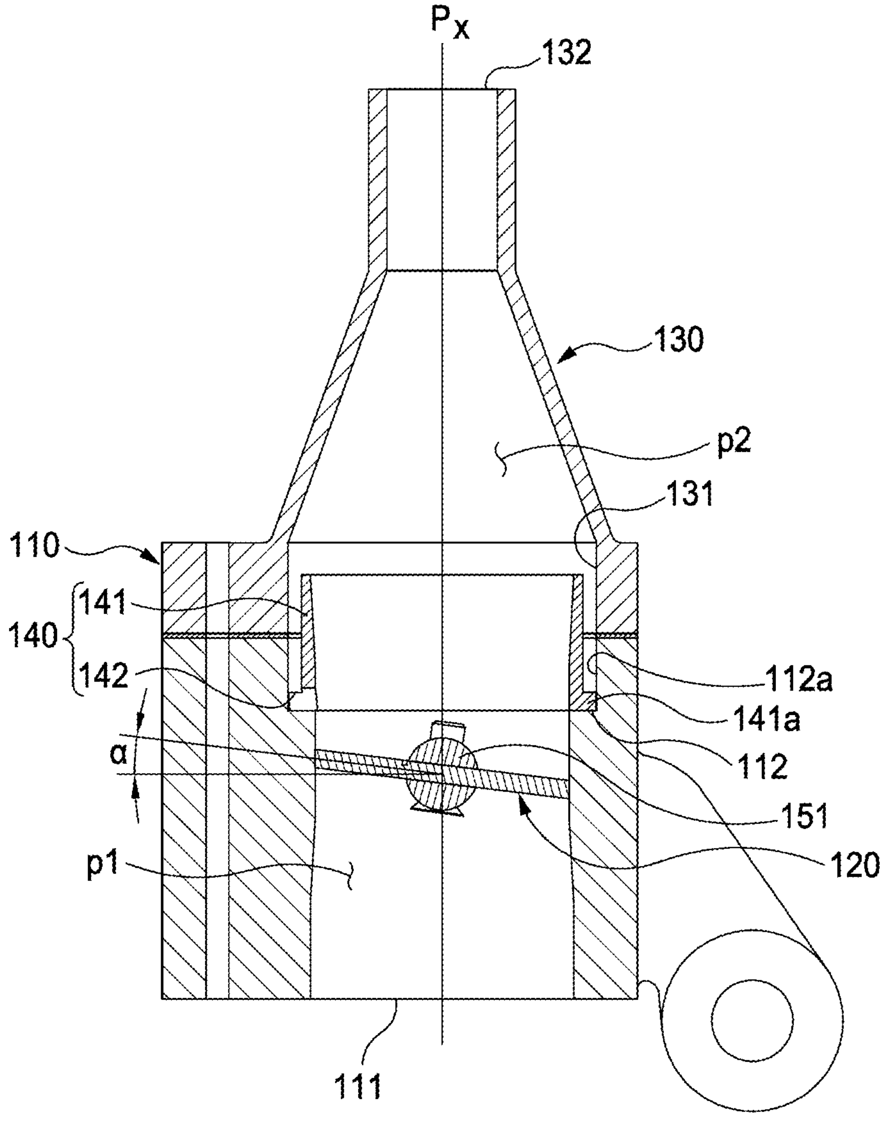
FIG. 4 is a cross-sectional view taken along line II-II of FIG. 1.
Figure 5:
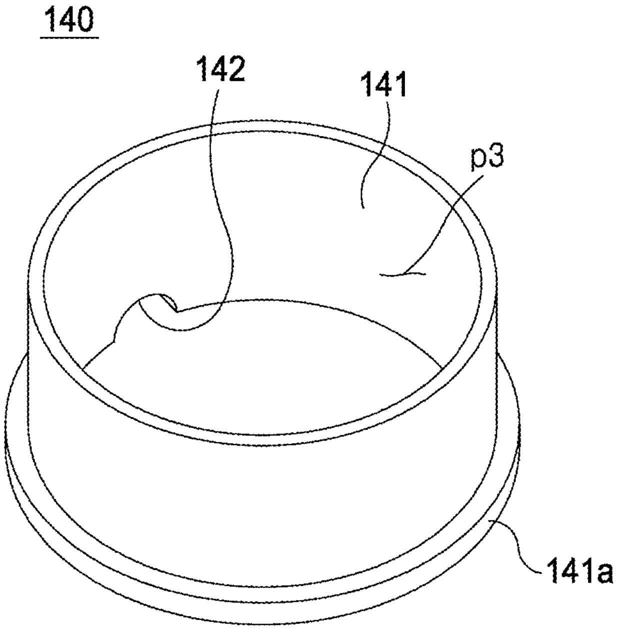
FIG. 5 is a diagram illustrating a trap adapter according to an embodiment of the present disclosure.

FIG. 1 is a perspective view illustrating an exhaust gas recirculation (EGR) valve 100 according to an embodiment of the present disclosure, FIG. 2 is an exploded perspective view of the EGR valve 100 of FIG. 1, and FIG. 3 is a cross-sectional view taken along line I-I of FIG. 1. FIG. 4 is a cross-sectional view taken along line II-II of FIG. 1. FIG. 5 is a diagram illustrating a trap adapter 140 according to an embodiment of the present disclosure.

Referring to FIGS. 1 to 4, the EGR valve 100 according to an embodiment of the present disclosure may include a valve housing 110, a valve flap 120, an exhaust duct 130, the trap adapter 140, and a flap drive portion 150.

The EGR valve 100 according to an embodiment of the present disclosure may be connected to a new intake system of an engine including a combustion chamber in a vehicle, for example, an intake throttle of an engine turbo inlet, and may reduce formation of pollutants such as nitrogen oxides by lowering the temperature of a combustion chamber by cooling exhaust gas discharged from the engine and recirculating the cooled exhaust gas to the combustion chamber.

The valve housing 110 may have a first inlet 111 formed at one side thereof through which exhaust gas flows in, and a first outlet 112 formed at the other side thereof through which exhaust gas is discharged. The valve housing 110 may form a flow passage p1 through which exhaust gas flows between the first inlet 111 and the first outlet 112.

That is, exhaust gas discharged from the engine flows into the valve housing 110 through the first inlet 111, and the exhaust gas that has flown into the first inlet 111 may be discharged into the exhaust duct 130 through the first outlet 112 via the flow passage p1. The exhaust gas discharged into the exhaust duct 130 may be recirculated to the combustion chamber, and the exhaust gas discharged through the first outlet 112 may be recirculated to the combustion chamber of the engine through the exhaust duct 130.

The valve flap 120 may be provided in the flow passage p1 and open or close the flow passage p1 to thereby control the flow of exhaust gas flowing from the flow passage p1 of the valve housing 110 to the exhaust duct 130.

The valve flap 120 may have a shape corresponding to a cross-sectional shape of the flow passage p1, and may open and close the flow passage p1 by rotating within the flow passage p1 through the flap drive portion 150 provided in the valve housing 110.

The flap drive portion 150 may include a flap rotation shaft 151 which has a length and a central axis Ax in a direction perpendicular to an axial central axis Px of the flow passage p1, and to which the valve flap 120 is detachably fixed, and a driving motor 153 that is connected to the flap rotation shaft 151 via a power transmission means 152 and provides a driving force to the power transmission means 152 to rotate the flap rotation shaft 151.

The power transmission means 152 may have a gear-type connection structure including a plurality of gears connecting a drive shaft **153*a* of the driving motor 153 to the flap rotation shaft 151**, but is not limited thereto, and various types of connection structures for power transmission may be applied.

An opening hole **151*a* may be formed in the flap rotation shaft 151, and a fastening member such as a bolt may be fastened to the flap rotation shaft 151 and the valve flap 120 while the valve flap 120 is inserted into the opening hole 151*a*. Accordingly, the valve flap 120 may be detachably fixed to the flap rotation shaft 151**.

While being fixed to the flap rotation shaft 151, the valve flap 120 may open and close the flow passage p1 of the valve housing 110 while rotating as a single body with the flap rotation shaft 151. The valve flap 120 may control the flow of exhaust gas from the flow passage p1 to an exhaust passage p2 of the exhaust duct 130.

A return spring 154 may be coupled to one end of the flap rotation shaft 151, which is connected to the power transmission means 152. In addition, when the driving motor 153 is not in operation, the flap rotation shaft 151 may be maintained in an elastically rotated state such that the valve flap 120 closes the flow passage p1 by the elastic restoring force of the return spring 154.

Referring to FIG. 4, the valve flap 120 may be formed at such an angle ($\alpha$) with respect to a cross-section of the flow passage p1 in a direction in which exhaust gas flows when the flow passage p1 is closed is approximately 7°. The valve flap 120 may be rotated such that the angle ($\alpha$) with respect to the cross-section of the flow passage p1 in the direction in which exhaust gas flows when the flow passage p1 is opened is about 20° to about 50°.

This is because, when the angle ($\alpha$) of the valve flap 120 rotates less than 20°, the fluidity of the exhaust gas decreases, and when the angle ($\alpha$) of the valve flap 120 rotates more than 50°, the differential pressure decreases, making it difficult to discharge condensate collected in the trap adapter 140, by using the flow pressure of the exhaust gas.

The exhaust duct 130 may be provided at the first outlet 112 of the valve housing 110, and may include at one side thereof a second inlet 131 through which exhaust gas flows in from the first outlet 112. The exhaust duct 130 may have a second outlet 132 formed on the other side thereof through which exhaust gas is discharged, and the exhaust passage p2 through which exhaust gas flows may be formed between the second inlet 131 and the second outlet 132.

The exhaust passage p2 may be formed such that the central axis Px coincides with the flow passage p1 of the valve housing 110, and an inner surface of the exhaust duct 130, i.e., the cross-section of the exhaust passage p2, may be formed in a shape that is reduced in a discharge direction of exhaust gas, but is not limited thereto.

The trap adapter 140 may be provided at the first outlet 112 of the valve housing 110 to collect condensate generated in the exhaust passage p2 and discharge the same to the flow passage p1.

Referring to FIG. 5, the trap adapter 140 may include a body portion 141 having a connection flow passage p3 communicating with the flow passage p1 and the exhaust passage p2, and a discharge hole portion 142 formed at one end of the body portion 141 adjacent to the flow passage p1 to guide the collected condensate to the flow passage p1.

The valve housing 110 may include a stepped groove portion **112*a* formed in an inner surface of the first outlet 112 through which exhaust gas is discharged. The trap adapter 140 may include a stepped portion 141*a* formed on an outer surface of one end of the body portion 141 and corresponding to the stepped groove portion 112*a***.

The stepped groove portion **112*a* may be formed by extending the inner surface of the first outlet 112. In other words, the stepped portion 141*a* may protrude from an outer surface of the body portion 141 in a shape corresponding to the stepped groove portion 112*a*. One end of the body portion 141 of the trap adapter 140 may be fixed to the first outlet 112 of the valve housing 110 as the stepped portion 141*a* is coupled to the stepped groove portion 112*a*** by a press-fit method or the like.

When the stepped portion **141*a* is coupled to the stepped groove portion 112*a*, the body portion 141 may be arranged across the flow passage p1 and the exhaust passage p2, and the outer surface of the body portion 141 may be formed to be spaced apart from an inner surface of the stepped groove portion 112*a* and the inner surface of the exhaust duct 130. The inner surface of the stepped groove portion 112*a* and the inner surface of the exhaust duct 130 may abut on each other such that the condensate generated on the inner surface of the exhaust duct 130 may be easily captured on the stepped portion 141*a* of the trap adapter 140 along the inner surface of the exhaust duct 130 and through the inner surface of the stepped groove portion 112*a***.

Accordingly, a separation space may be formed between the inner surface of the stepped groove portion 112*a* and the inner surface of the exhaust duct 130 and the outer surface of the body portion 141, and through the separation space, condensate generated on the inner surface of the exhaust duct 130 may be collected on the stepped portion 141*a* along the inner surface of the exhaust duct 130. The captured condensate may be guided in real time to the flow passage p1 through the discharge hole portion 142.

In the EGR valve 100 according to an embodiment of the present disclosure, when the flap drive portion 150 is operated, the flow passage p1 may be opened by the rotation of the valve flap 120, and a choking phenomenon may occur near the discharge hole portion 142 due to the flow force of the exhaust gas flowing to the opened portion. The condensate collected on the stepped portion 141*a* may be guided to the flow passage p1 through the discharge hole portion 142 through the choking phenomenon and then smoothly discharged together with the exhaust gas in real time.

As above, according to the EGR valve 100 according to an embodiment of the present disclosure, condensate generated on the inner surface of the exhaust duct 130 when the EGR valve 100 is operated may be captured in real time through the trap adapter 140 and guided to the flow passage p1 through the discharge hole portion 142 and be discharged into the exhaust duct 130 together with the exhaust gas, thereby effectively preventing condensate generated in the exhaust duct 130, from flowing into the valve housing 110.

Thus, according to the EGR valve 100 according to an embodiment of the present disclosure, the condensate generated in the exhaust duct 130 may be prevented from flowing into the valve housing 110 and oxidizing or corroding the inner surface of the flow passage p1. In particular, according to the EGR valve 100 according to an embodiment of the present disclosure, degradation of the performance or durability of the EGR valve 100 due to freezing of condensate flowing into the valve housing 110, in the valve flap 120 and the flap drive portion 150 in a low-temperature environment, may be prevented.

In the trap adapter 140 according to an embodiment of the present disclosure, the discharge hole portion 142 may be formed at a position corresponding to one side (corresponding to the left end in FIG. 4) of the valve flap 120 rotating toward the exhaust passage p2 when the valve flap 120 rotates.

In detail, the second outlet 132 of the exhaust duct 130 may be installed to face upward, and when the flow passage p1 is opened, one side (corresponding to the left end in FIG. 4) of the valve flap 120 may be rotated toward the exhaust passage p2 and the other side of the valve flap 120 may be rotated toward the flow passage p1. In this case, in the space of the flow passage p1 opened by the rotation of the other side of the valve flap 120, the flow force of exhaust gas is inevitably relatively low.

Thus, when the condensate collected in the stepped portion 141*a* of the trap adapter 140 is discharged through the discharge hole portion 142 formed at a position corresponding to the other side of the valve flap 120, the condensate is not discharged to the exhaust passage p2 by the flow force of the exhaust gas, but is discharged to the flow passage p1 by gravity and may flow into the valve housing 110.

Thus, the discharge hole portion 142 formed in the outer surface of the body portion 141 of the trap adapter 140 may be formed at a position corresponding to one side (the left end with respect to FIG. 4) of the valve flap 120 rotating toward the exhaust passage p2 when the EGR valve 100 is operated.

The discharge hole portion 142 having a single semicircular shape is disclosed, but is not limited thereto and may be formed in plurality and in a triangular or polygonal shape. As an embodiment, the discharge hole portion 142 may be formed in the outer surface of the body portion 141 of the trap adapter 140, at a position adjacent to the stepped portion 141*a* and corresponding to one side (corresponding to the left end in FIG. 4) of the valve flap 120.

The EGR valve 100 according to an embodiment of the present disclosure may further include a sealing member 160 located between the valve housing 110 and the exhaust duct 130.

The valve housing 110 and the exhaust duct 130 may be coupled to each other using a fastening member such as a bolt, and when coupled, the valve housing 110 and the exhaust duct 130 are coupled to each other with the sealing member 160 positioned on a contact surface between the valve housing 110 and the exhaust duct 130, and accordingly, airtightness between the valve housing 110 and the exhaust duct 130 may be maintained.

The sealing member 160 may include a gasket having a shape corresponding to the shape of the contact surface of the valve housing 110 and the exhaust duct 130, but is not limited thereto.

Figure 6:
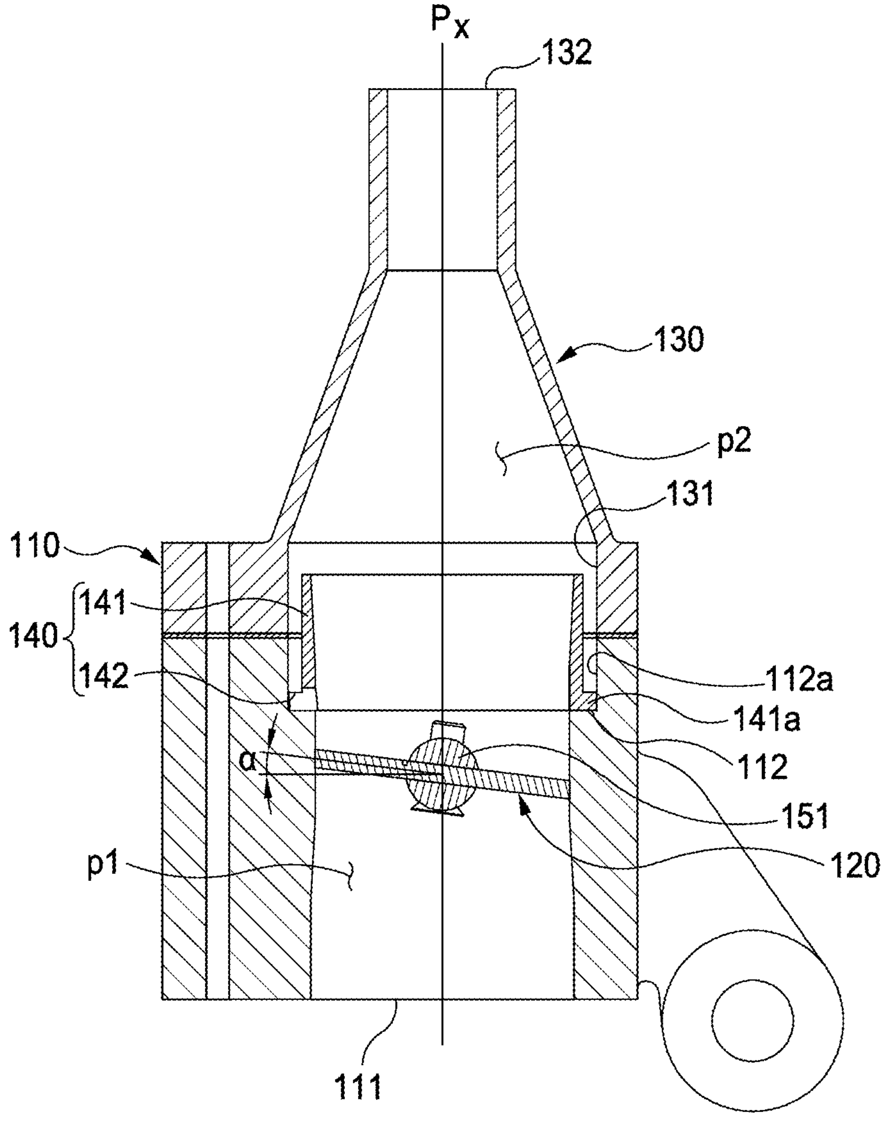
FIG. 6 is a cross-sectional view of a main portion for describing a state in which condensate is generated inside an exhaust duct of an EGR valve, according to an embodiment of the present disclosure.
Figure 7:
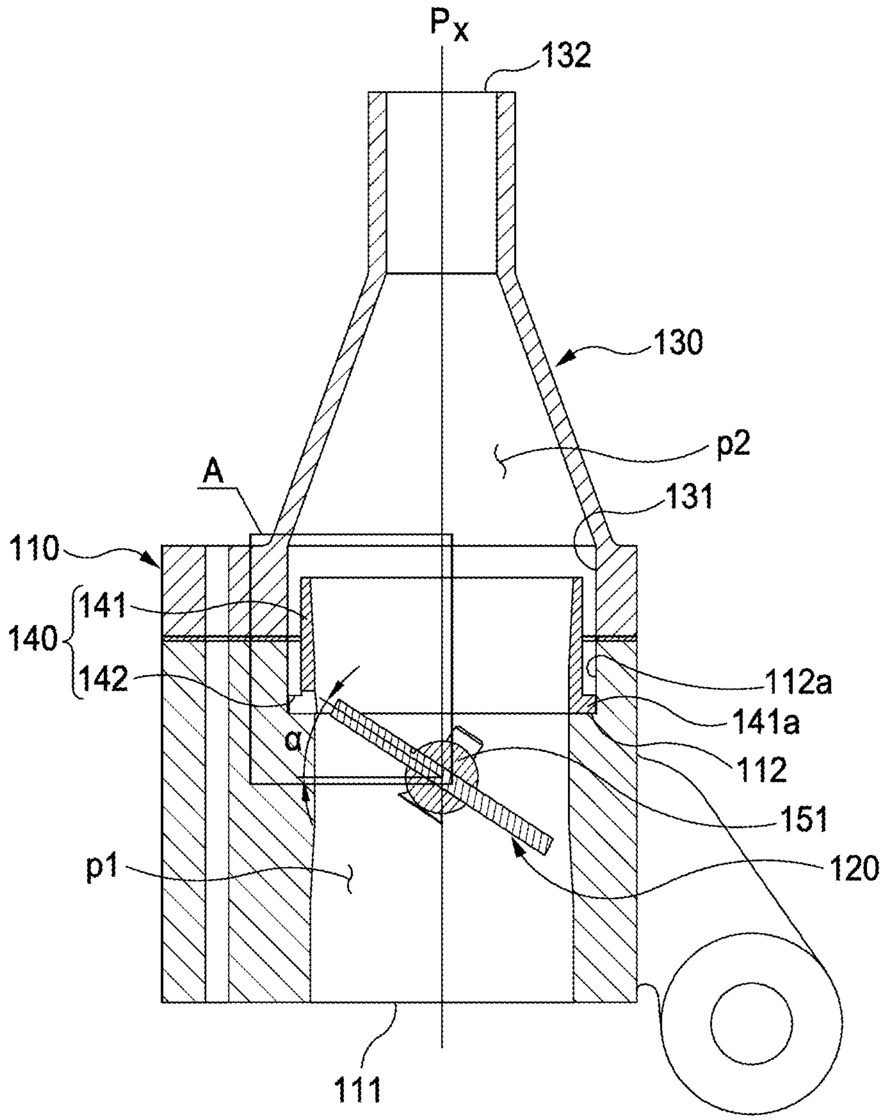
FIG. 7 is a cross-sectional view of a main portion for describing a state in which the condensate generated in the embodiment of FIG. 6 is captured by a trap adapter.
Figure 8:
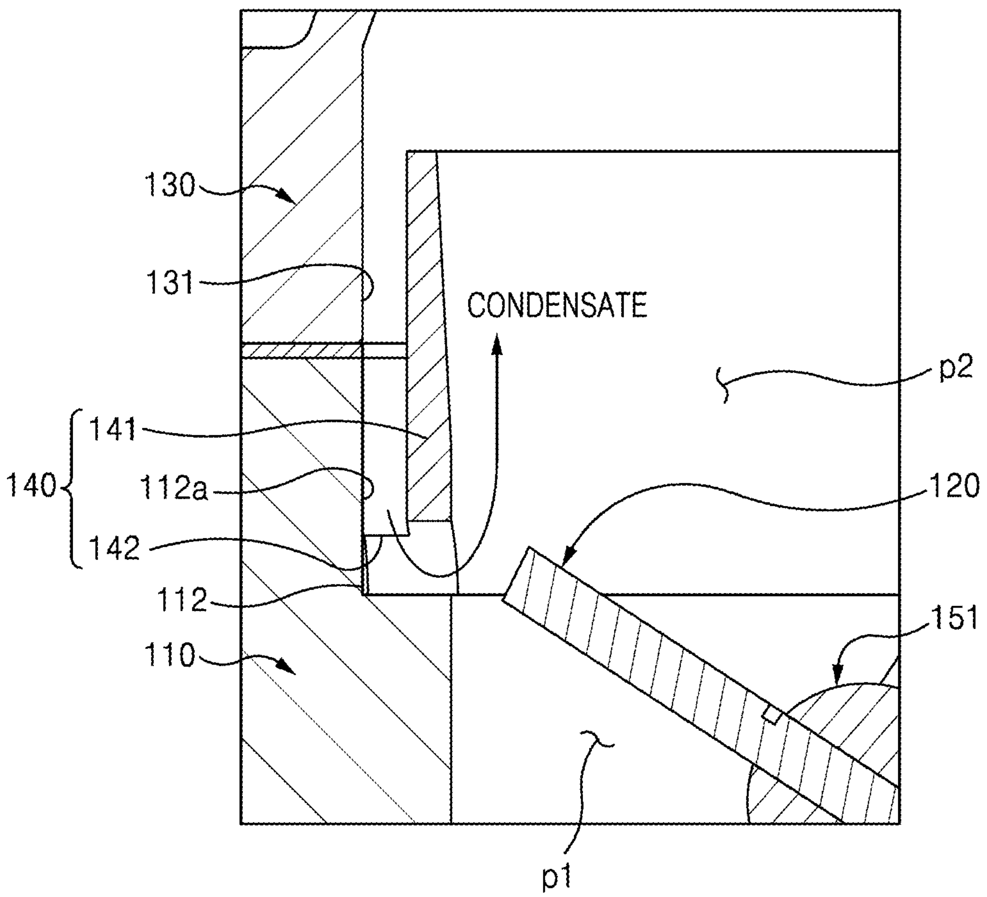
FIG. 8 is an enlarged view of region A of FIG. 7.

FIG. 6 is a cross-sectional view of a main portion for describing a state in which condensate is generated inside the exhaust duct 130 of the EGR valve 100 according to an embodiment of the present disclosure, FIG. 7 is a cross-sectional view of a main portion for describing a state in which the condensate generated in FIG. 6 is captured by the trap adapter 140, and FIG. 8 is an enlarged view of region A for describing a state in which the condensate captured in the trap adapter 140 in FIG. 7 is discharged into a flow passage of exhaust gas through the discharge hole portion 142.

Hereinafter, with further reference to FIGS. 6 to 8, a process of discharging condensate formed on the inner surface of the exhaust duct 130 during an exhaust gas recirculation process of the EGR valve 100 according to an embodiment of the present disclosure will be described.

According to the EGR valve 100 according to an embodiment of the present disclosure, formation of pollutants may be reduced by lowering the temperature of a combustion chamber by cooling exhaust gas discharged from an engine and recirculating the cooled exhaust gas into the combustion chamber.

Referring again to FIGS. 3 and 6, in the EGR valve 100 according to an embodiment of the present disclosure, the flap drive portion 150 is not operated before recirculation of the exhaust gas, and the valve flap 120 may elastically close the flow passage p1 of the valve housing 110 by the elastic restoring force of the return spring 154 coupled to the flap rotation shaft 151.

The valve flap 120 may be formed such that the angle ($\alpha$) formed by the cross-section of the flow passage p1 (corresponding to the horizontal direction in FIG. 6) in a direction in which the exhaust gas flows when the flow passage p1 is closed is approximately 7°.

As the valve flap 120 is tilted at an angle of approximately 7° toward the exhaust passage p2 when the flow passage p1 is closed, the flow force of the exhaust gas may act in a rotational direction of the valve flap 120 when the EGR valve 100 is operated, and the flap drive portion 150 of the valve flap 120 may easily rotate the valve flap 120 even with a relatively small driving force.

Referring back to FIGS. 3, 7, and 8, the EGR valve 100 according to an embodiment of the present disclosure opens the flow passage p1 of the valve housing 110 by rotating the valve flap 120 to recirculate exhaust gas discharged from an engine.

The valve flap 120 is rotated via the flap drive portion 150 and returned through the elastic restoring force of the return spring 154 to open and close the flow passage p1, thereby controlling the flow of the exhaust gas from the flow passage p1 to the exhaust passage p2 of the exhaust duct 130.

When the valve flap 120 rotates through the flap drive portion 150 to open the flow passage p1, the angle ($\alpha$) formed by the valve flap 120 with respect to the cross-section of the flow passage p1 (corresponding to the horizontal direction in FIG. 7) may be about 20° to about 50°.

If the angle ($\alpha$) of the valve flap 120 is less than 20°, the fluidity of the exhaust gas decreases, and if the angle ($\alpha$) of the valve flap 120 is greater than 50°, the differential pressure decreases, making it difficult to discharge the condensate collected in the trap adapter 140, by using the fluidity of the exhaust gas.

When the flow passage p1 is opened by the rotation of the valve flap 120, the exhaust gas flowing into the flow passage p1 is discharged into the exhaust passage p2, and the exhaust gas flowing into the exhaust passage p2 is recirculated to the combustion chamber of the engine.

Due to the temperature difference between the inside and outside of the exhaust duct 130, the exhaust gas flowing from the flow passage p1 to the exhaust passage p2 contacts the inner surface of the exhaust duct 130, generating condensate.

The trap adapter 140 according to an embodiment of the present disclosure may capture in real time the condensate generated on the inner surface of the exhaust duct 130 and guide and discharge the same to the flow passage p1 and the exhaust passage p2, thereby preventing the condensate generated on the inner surface of the exhaust duct 130 from flowing into the valve housing 110.

The trap adapter 140 may include the body portion 141 having a hollow tubular shape and the stepped portion **141*a* protruding from the outer surface of one end of the body portion 141. The stepped groove portion 112*a* to which the stepped portion 141*a* may be coupled by a press-fit method or the like may be formed in the first outlet 112 of the valve housing 110**.

When the stepped portion **141*a* is coupled to the stepped groove portion 112*a*, the body portion 141 may be positioned across the flow passage p1 and the exhaust passage p2. The outer surface of the body portion 141 may be spaced apart from the inner surface of the stepped groove portion 112*a* and the inner surface of the exhaust duct 130**.

That is, the body portion 141 of the trap adapter 140 according to an embodiment of the present disclosure may form a double-pipe structure with the inner surface of the stepped groove portion **112*a* and the inner surface of the exhaust duct 130. In addition, the trap adapter 140 may easily trap the condensate generated on the inner surface of the exhaust duct 130, on the stepped portion 141*a*, along the inner surface of the exhaust duct 130 and the inner surface of the stepped groove portion 112*a***.

The rotation of the valve flap 120 causes the exhaust gas to flow into the open area between one side of the valve flap 120 (corresponding to the left end in FIG. 8) and the discharge hole portion 142 of the trap adapter 140. In addition, a choking phenomenon may occur near the discharge hole portion 142 due to the flow force of the exhaust gas, and thus, the condensate collected in the stepped portion **141*a* of the trap adapter 140 may be guided and discharged in real time to the flow passage p1 and the exhaust passage p2 together with the exhaust gas flowing through the discharge hole portion 142**.

According to an EGR valve 100 according to an embodiment of the present disclosure, the condensate generated on the inner surface of the exhaust duct 130 may be captured in real time by the trap adapter 140 and easily discharged to the flow passage p1 and exhaust passage p2 through the discharge hole portion 142, thereby effectively preventing the condensate generated on the inner surface of the exhaust duct 130 from flowing into the valve housing 110.

Thus, according to the EGR valve 100 according to an embodiment of the present disclosure, the condensate generated in the exhaust duct 130 may be effectively prevented from flowing into the valve housing 110 and oxidizing or corroding the inner surface of the flow passage p1. In particular, according to the EGR valve 100 according to an embodiment of the present disclosure, degradation of the performance or durability of the EGR valve 100 due to freezing of condensate flowing into the valve housing 110, in the valve flap 120 and the flap drive portion 150 in a low-temperature environment, may be prevented.

While the present disclosure has been particularly shown and described with reference to examples thereof, it will be understood by those of ordinary skill in the art that various changes in form and details may be made therein without departing from the spirit and scope of the disclosure as defined by the following claims.

According to the embodiments, flowing of condensate generated on the inner surface of the exhaust duct, into the EGR valve, may be prevented, thereby preventing corrosion of the valve housing and thus preventing degradation of the performance or durability of the EGR valve.

Additionally, by separating the exhaust duct from the valve housing, the trap adapter coupled to the outlet of the valve housing may be exposed, which facilitates maintenance and reduces maintenance costs.

However, the effects that may be obtained through the present disclosure are not limited to the effects described above, and other technical effects not mentioned will be clearly understood by those skilled in the art from the description of the present disclosure described below.

What is claimed is:

1. An exhaust gas recirculation (EGR) valve comprising:
- a valve housing comprising a flow passage through which exhaust gas of an engine passes;
- a valve flap disposed inside the flow passage and configured to open and close the flow passage;
- an exhaust duct disposed on one side of the valve housing and including an exhaust passage communicating with the flow passage; and
- a trap adapter disposed at an outlet of the flow passage and configured to capture condensate generated in the exhaust passage and discharge the condensate to the flow passage.

2. The EGR valve of claim 1, wherein the trap adapter comprises:
- a body portion having a pipe shape that is opened on opposite sides in an axial direction, and having an outer surface spaced apart from an inner surface of the exhaust duct; and
- a discharge hole portion which is formed at one end of the body portion adjacent to the flow passage and guides, to the flow passage, condensate collected in a space between the inner surface of the exhaust duct and the outer surface of the body portion.

3. The EGR valve of claim 2, wherein the valve housing comprises a stepped groove portion formed on an inner surface of an outlet through which the exhaust gas is discharged, and the trap adapter comprises a stepped portion formed on an outer surface of one end of the body portion and coupled to the stepped groove portion.

4. The EGR valve of claim 3, wherein, when the stepped portion is coupled to the stepped groove portion, an inner surface of the body portion is connected to an inner surface of the flow passage.

5. The EGR valve of claim 2, wherein the discharge hole portion is formed at a position corresponding to one side of the valve flap rotating toward the exhaust passage when the flow passage is opened by rotation of the valve flap.

6. The EGR valve of claim 1, wherein the exhaust duct is formed such that a cross-sectional area of the exhaust passage is gradually reduced in a direction in which the exhaust gas is discharged.

7. The EGR valve of claim 1, further comprising a sealing member provided between the valve housing and the exhaust duct to maintain airtightness.

8. A trap adapter for an exhaust gas recirculation (EGR) valve, the trap adapter comprising:

a body portion provided between a flow passage of a valve housing and an exhaust passage of an exhaust duct coupled to the valve housing, wherein the body portion has an outer surface spaced apart from an inner surface of the exhaust duct; and a discharge hole portion formed at one end of the body portion adjacent to the flow passage and configured to guide, to the flow passage, condensate collected in a space between the inner surface of the exhaust duct and the outer surface of the body portion, wherein the valve housing comprises a stepped groove portion formed on an inner surface of an outlet through which the exhaust gas is discharged, and the body portion comprises a stepped portion formed on an outer surface of one end of the body portion and coupled to the stepped groove portion.

9. The trap adapter of claim 8, wherein the discharge hole portion is formed at a position corresponding to one side of a valve flap rotating toward the exhaust passage when the flow passage is opened.

10. The trap adapter of claim 8, wherein, when the stepped portion is coupled to the stepped groove portion, an inner surface of the body portion is connected to an inner surface of the flow passage.

* * * * *